US010545052B2

(12) United States Patent
Hoeksema et al.

(10) Patent No.: US 10,545,052 B2
(45) Date of Patent: Jan. 28, 2020

(54) PYRANOMETER WITH FORCED AIRFLOW

(71) Applicant: HUKSEFLUX HOLDING B.V., Delft (NL)

(72) Inventors: Eric Richard Hoeksema, The Hague (NL); Cornelis Jan Van Den Bos, Delft (NL)

(73) Assignee: HUKSEFLUX HOLDING B.V., Delft (NL)

( * ) Notice: Subject to any disclaimer, the term of this patent is extended or adjusted under 35 U.S.C. 154(b) by 183 days.

(21) Appl. No.: 15/555,042

(22) PCT Filed: Feb. 23, 2016

(86) PCT No.: PCT/NL2016/050129
§ 371 (c)(1),
(2) Date: Aug. 31, 2017

(87) PCT Pub. No.: WO2016/140566
PCT Pub. Date: Sep. 9, 2016

(65) Prior Publication Data
US 2018/0038738 A1 Feb. 8, 2018

(30) Foreign Application Priority Data

Mar. 3, 2015 (NL) ...................................... 2014385

(51) Int. Cl.
*G01K 1/00* (2006.01)
*G01K 13/00* (2006.01)
(Continued)

(52) U.S. Cl.
CPC .............. *G01J 5/042* (2013.01); *G01J 1/4204* (2013.01); *G01J 5/029* (2013.01); *G01J 2001/4285* (2013.01)

(58) Field of Classification Search
USPC ........................................ 374/208, 163, 141
See application file for complete search history.

(56) References Cited

U.S. PATENT DOCUMENTS 2,768,527 A 10/1956 Stern et al.
3,876,880 A 4/1975 Guicherd
(Continued)

FOREIGN PATENT DOCUMENTS

CN 203415243 U 1/2014
DE 10 2012 024 110 A1 6/2014
GB 1446504 A 8/1976

OTHER PUBLICATIONS

International Search Report, dated May 17, 2016, from corresponding PCT application No. PCT/NL2016/050129.

*Primary Examiner* — Mirellys Jagan
(74) *Attorney, Agent, or Firm* — Young & Thompson

(57) ABSTRACT

Disclosed is a pyranometer with a housing, a sensor in the housing, an inner window and an outer dome-shaped window both overlying the sensor. An air inlet duct and an air outlet duct extend in the housing and end in a space confined by the outer window for passing air through the space, from the inlet duct to the outlet duct. The housing is substantially closed such that no outside air flows are allowed into the housing and includes a ventilator, the inlet duct being in fluid communication with a high pressure side of the ventilator, the outlet duct being in fluid communication with a low pressure side of the ventilator. The air blown into the space below the outer window is heated by the ventilator power and optionally by and added electrical heater.

18 Claims, 2 Drawing Sheets

(51) Int. Cl.
*G01J 5/04* (2006.01)
*G01J 1/42* (2006.01)
*G01J 5/02* (2006.01)

(56) References Cited

U.S. PATENT DOCUMENTS

| | | | | |
|---|---|---|---|---|
| 2004/0016865 A1* | 1/2004 | Little | ......................... | G01J 1/04 250/203.1 |
| 2011/0030728 A1* | 2/2011 | Semmer | ..................... | B08B 3/02 134/18 |
| 2011/0198480 A1* | 8/2011 | Dolce | ........................ | G01J 1/02 250/203.4 |

* cited by examiner

PYRANOMETER WITH FORCED AIRFLOW

FIELD OF THE INVENTION

The invention relates to a pyranometer with a housing, a thermo-electric sensor in said housing, an inner window and an outer dome-shaped window both windows overlying the sensor, an air inlet duct and an air outlet duct extending in the housing and ending in a space that is bounded by the outer window for passing air through said space, from the inlet duct to the outlet duct.

BACKGROUND OF THE INVENTION

Such a radiation detection device in the form of a pyranometer is known from U.S. Pat. No. 3,876,880. In this publication a pyranometer is described in which an external pump and heat exchanger provide a cooling air stream to the detector housing for cooling the inner and outer domes. In addition, an external blower directs an air stream across the domes for increasing the radiation measurement accuracy.

It is commonly known in pyranometers (for instance model SR11, marketed by Hukseflux Thermal Sensors B.V., Delft, Netherlands) to utilize an inner and outer glass dome overlying the sensor. The two glass domes reduce wind related signal noise and thermal offset related error effects, resulting in improved measurement accuracy.

Zero offsets and deposition of water on the instrument dome are important factors determining the reliability of measurements with pyranometers.

Pyranometers that comply with the ISO 9060 standard must have a flat spectral response in the 0.3 to 3 micron spectral range. They employ thermo-electric sensors. Using thermal-electric sensors (as opposed to photo-electric sensors), zero offsets, i.e. signals not related to the quantity to be measured, are a significant source of measurement uncertainty. Reduction of zero offsets is useful because this improves measurement accuracy.

The most significant offset is the sensitivity to far-infra-red radiation exchange, the "zero offset A", as defined by the ISO 9060 standard which classifies pyranometers. Zero offset A is caused by the outer dome cooling down by radiation exchange with the sky, which is a relatively cold source of far-infra-red radiation. The balance of the far-infra-red radiation exchange from the outer dome to the sky is negative. The WMO manual and ISO 9060 define a reference condition of −200 W/m$^2$, representing worst case conditions. The outer dome turns cold, and on its turn cools down the inner dome by the same mechanism of radiation exchange. Finally the sensor produces a negative offset by its radiation exchange with the inner dome.

There are other significant offsets such as "zero offset B", defined as the offset caused by heating or cooling the instrument with a fixed temperature rate of change of 5 K/hr. This temperature change produces internal temperature differences in the instrument. These differences not only cause far-infra-red radiation exchange but also generate energy flows to or from the sensor. Both mechanisms generate zero offsets adding up to zero offset B.

Heating a pyranometer, for example by using an electrical resistor or by externally applied heated ventilation air may independently produce zero offsets by the same mechanisms that cause zero offset B. Offsets caused by heating are not specifically mentioned or defined in the ISO 9060 standard. In practice they are an integral part of the measurement, and therefore part of the measured zero offset A and zero offset B. For one instrument model there may be offset A and B specifications with heating and without heating.

Deposited water on pyranometer domes leads to unpredictable and potentially very large but non-quantifiable errors; it reduces the "data availability". Deposition of rain and snow are quite common, but this usually goes together with cloudy conditions under which the measurement errors are small. Most pyranometers are located in moderate climate zones. Deposition of dew or frost on dome in the early morning regularly causes large errors. Water condenses on the dome because at night by far-infra-red radiation exchange with the sky these cool down to a temperature below dew point.

A pyranometer with water deposited on the dome operates beyond its rated conditions. Prevention of deposition of water or fast removal of deposited water is useful because a dry dome is the rated condition for a reliable measurement. A dry dome also is unattractive for dust to stick to.

Lower zero offsets of thermo electric sensors may be attained by improving thermal coupling between the thermal sensor, the instrument metal body and the inner window. Better thermal coupling results in smaller temperature differences between these parts and thereby to reduced far-infra-red radiation exchange.

For example, the model CMP22 pyranometer attains lower zero offsets than the otherwise equivalent model CMP11 by using two quartz domes with a higher thermal conductivity and larger thickness than the CMP11 domes. Zero offsets are reduced by a factor 2.

A second example is that the inner dome acts as a radiation shield between the outer dome and the sensor, blocking radiation far-infra-red radiation exchange. By adding the inner dome to a pyranometer only employing a single outer dome, the far-infra-red radiation exchange from the dome to the sensor, and thus zero offset A, is reduced by a factor of approximately 1.5. This is illustrated by comparing zero offset A specifications of pyranometer models CMP11 and CMP3.

As a third example, high wind speed or artificial ventilation may reduce zero offset A by promoting thermal coupling between the pyranometer body and outer dome. For zero offset B, the part of the zero offset caused by energy flows to or from the sensor may be reduced by symmetrically coupling a sensor to the instrument body, or by using a sensor with a low heat capacity. Some sensors employ a so-called compensation element.

Heating a pyranometer dome may help prevent dew and frost. A heated dome should have a temperature above dew point, so that moisture in the ambient air does not condense on it. In case water is deposited, heating accelerates evaporation of dew and rain, and promotes the process of sublimating or melting of snow and frost. To promote sublimation and melting, higher temperatures are beneficial. Melting requires a dome temperature above 0° C.

The simplest option would be to directly heat a pyranometer, i.e. internally or with a heater connected to the instrument body, as opposed to externally via ventilation air. Using traditional pyranometers, already at low power levels, where heating is not yet effective to prevent humidity from condensing on the instrument dome, the added zero offsets caused by direct heating are beyond the specification limits of the ISO 9060 standard. The standards covering pyranometer use such as ISO TR 9901 therefore do not mention direct heating as a possibility. In some cases direct heating is nevertheless used, for instance in pyranometer model SR20, where it is typically switched on at night only when offsets do not matter because there is no sun. The zero offset caused by 1.5 W direct heating is −8 W/m² which is beyond the specification limits of ISO 9060 for the accuracy class. Applying direct heating at higher power, for example to promote evaporation and sublimation or to melt snow or ice is possible, but creates still larger errors and therefore is not mentioned in any standard.

The present invention aims at improving the known detector construction by further reducing the zero offset while providing improved performance under moist and/or icy conditions at a low use of power.

Low power consumption is essential for use of pyranometers as these instruments are often applied in remote locations where mains power is not available.

The invention in particular aims at improving the thermal coupling between the sensor, the instrument metal body and the domes.

The invention furthermore aims at providing a detector with low maintenance and low power requirements and large data availability.

SUMMARY OF THE INVENTION

Hereto the pyranometer according to the present invention is characterized in that the housing is substantially closed such that no outside air flows are allowed into the housing that comprises a ventilator, the inlet duct being in fluid communication with a high pressure side of the ventilator, the outlet duct being in fluid communication with a low pressure side of the ventilator, wherein the air blown into the space below the outer window is heated by the ventilator power.

With the term substantially "closed" it is meant that no substantial outside air flows are allowed into the housing.

With the term 'thermo-electric sensor" as used herein, a sensor is intended having an absorbing sensor surface (which may be black). Radiation falling on the absorbing sensor surface causes heat flux though the sensor, which heat flux causes a temperature difference, which is converted into an electrical signal, for instance using a thermopile that is thermally coupled with the sensor surface.

The use of a substantially closed housing and integrated ventilator allows blowing a relatively warm air flow in the space below the outer dome in a closed circuit, thus maintaining a compact and relatively simple detector. The improved thermal coupling between the outer dome and the detector body caused by the air stream below the dome reduces the zero offset A. The air is heated by the ventilator power. Furthermore, the forced heating of the outer dome helps maintain its temperature above the dew point and/or helps in clearing the dome from snow or ice, hence increasing the data availability of the detector.

The closed circuit of the air flow inside the detector furthermore allows to use 100% of the power dissipated in the ventilator, and also any additional power generated in the detector, for heating the detector as well as the air flowing between the domes so that at low power consumption, the detector including the outer dome can be kept above the dew point.

Finally, the completely internal ventilation according to the invention, compared to known external ventilation, obviates the need for filtering of the external air, hence reducing maintenance requirements.

In one embodiment of a pyranometer according to the invention, the inner window is dome-shaped, wherein the air inlet duct and the air outlet duct are in fluid communication with the space between the inner and outer dome-shaped windows. The space between the inner and outer domes forms a channel through which heating air can be effectively supplied under optimized heat transfer conditions from the inlet opening to the outlet opening.

An alternative embodiment of a pyranometer according to the invention has an inner window that comprises a substantially flat diffusor. With a flat diffusor, a further reduction of zero offsets can be achieved. One embodiment of a pyranometer according to the invention is characterized in that the sensor is placed on a cylindrical sensor body, the housing comprising a cylindrical wall encasing the sensor body, the wall comprising an annular ventilator space below the sensor body, the air inlet duct extending from an upper ventilator space part axially through the cylindrical wall to an annular top surface of the cylindrical wall, the air outlet duct extending from a lower ventilator space part through the cylindrical wall to the annular top surface of the cylindrical wall. In this manner a compact radiation detector is achieved with a good thermal coupling between the cylindrical wall, that is preferably made of metal, and the domes. The air flow channels are accommodated in the cylindrical wall and are preferably mechanically formed or cast such that the heated air coming from the internal ventilator is in good conductive contact with the wall.

In case that the reflectivity of the material of the instrument body between the domes plays a role in the directional response of the instrument, it is essential that the exits of the air ducts do not introduce undesired variations of this directional response. Hereto it is avoided that the reflective properties of the air duct exits significantly differ from the material between the domes.

In another embodiment of a pyranometer according to the invention, an electrical heater is provided in or on the sensor body.

It is essential that the forced convection process and the heating, by the ventilator or electrical heater, are designed in such a way that the heating of the sensor, inner window and outer dome by the ventilated air and by the additional heating is well balanced and the process of internal heat transfer does not generate significant offsets.

Using a film heater, which is attached to the body combined with flow channels with a relatively large exchanging surface area through the same body, beneficially forces the temperature of all components to the body temperature.

To be effective preventing dew or frost deposition at night, the power level of ventilation plus additional heating must at least compensate for the energy loss of the pyranometer to the sky by far-infra-red radiation exchange. As an example, with an instrument surface area of 0.008 m² facing the sky and an estimated far-infra-red radiation exchange of −100 W/m², energy is lost by the pyranometer at a rate of 0.8 W.

Internal ventilation may be realized in pyranometers using a miniature ventilator. A typical ventilator power of a miniature ventilator suitable for the purpose is 0.5 W.

At night, without energy input from the sun, using 1 W additional electrical heating and 0.5 W ventilator power, a total of 1.5 W power consumption, compensating by −0.8 W for far-infra-red radiation exchange, a pyranometer will typically stabilize at a temperature of around 1° C. above ambient air temperature, and thus at least 1° C. above dew point. This is consistent with an instrument total surface area of 0.05 m² and a heat transfer coefficient of the order 20 W/(K·m²) which is typical for an air speed of 1 m/s.

As an example illustrating capability to reduce zero offsets with internal ventilation:

In case the pyranometer model SR20, as marketed by Hukseflux Thermal Sensors B.V. of Delft, NL, is internally ventilated between its 2 domes, zero offset A is reduced by a factor 5. This is better than achieved by the combination of external ventilation unit model VUO1 and pyranometer model SR20, which reach a reduction by a factor 2.

As an example illustrating capability to work effectively against dew and frost at low power:

During field tests in The Netherlands the 1.5 W total (heating plus ventilation) power proves effective against dew deposition.

The 1.5 W power consumption and the offset in the order of 1.5 W/m² of an SR20 with internal ventilation compare favorably to the typical heated ventilator. To have similar effectivity pyranometer model SR20 and ventilation unit VUO1 require 11 W generating a 2 W/m² offset.

Typically the heating will be limited to a specified maximum level of permissible heating, in W, at which the instrument still performs within certain target zero offset limits, in W/m², for example the maximum limits as specified by the user or in the classification system.

The invention may be combined with traditional features of pyranometers such as indirect heating and external ventilation. More windows or domes may be added. Different gasses may be used. It may be combined with model-based zero offset corrections for example from analysis of temperature measurements in the instrument or estimates of the far-infra-red radiation exchange between the instrument and the sky using a pyrgeometer. It may be combined with other measures to prevent zero offsets that are not included in the classification system, for example measures to reduce offsets induced by thermal shocks, such as increasing body weight or insulating the instrument body from contact with the ambient air.

BRIEF DESCRIPTION OF THE DRAWING

An embodiment of a pyranometer according to the invention will by way of non-limiting example be described with reference to the accompanying drawings which.

DETAILED DESCRIPTION OF THE INVENTION

Figure 1:
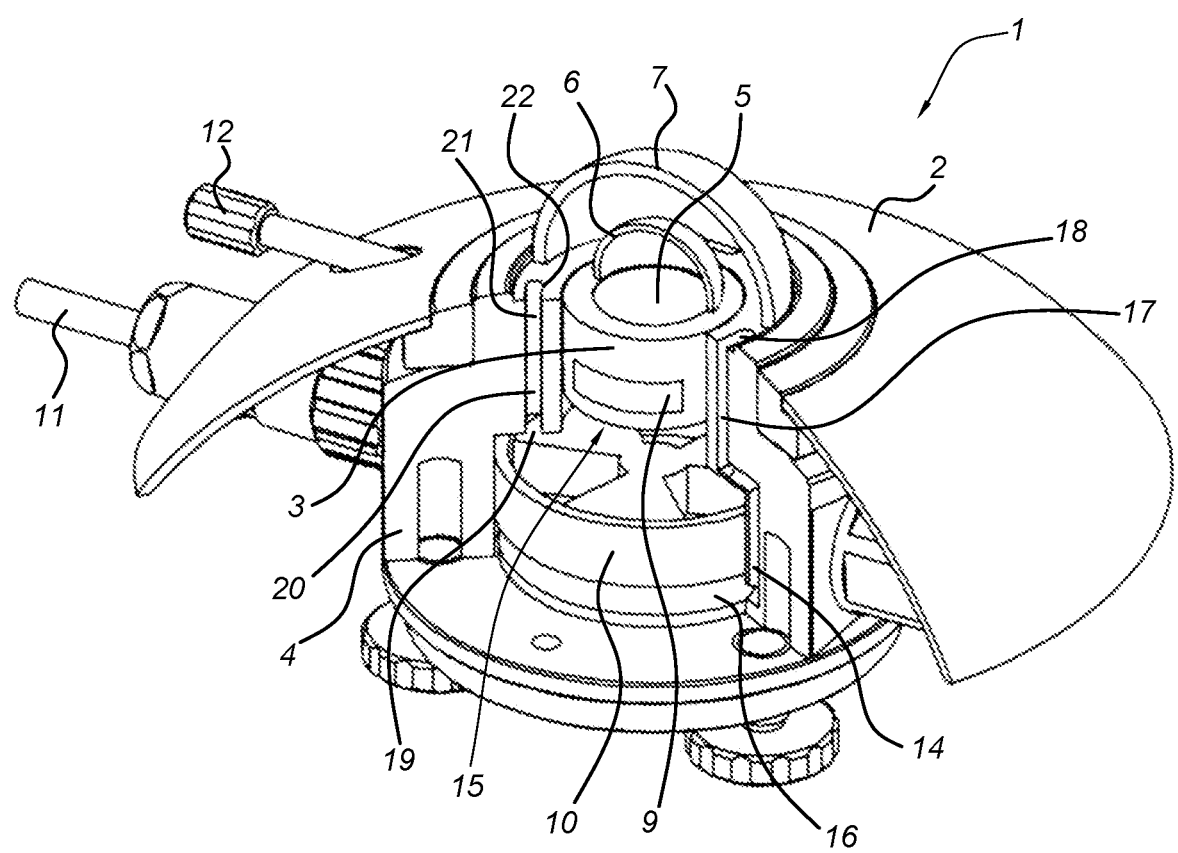
FIG. 1 is a partially cut-away perspective view of a pyranometer having an inner and an outer dome and comprising an internal ventilator according to the invention.

In the FIG. 1, a pyranometer 1 is shown with a substantially closed housing 2 encompassing a detector body 3, a cylindrical metal wall 4 and a thermal sensor 5. The sensor 5 is covered by an inner dome 6 in thermal contact with a top face of the body 3 and an outer dome 7 that is in thermal conducting contact with a top face of the detector wall 4.

Enclosed by the wall 4, a ventilator space 15 houses a mini ventilator 10, which may have a diameter of for instance 3.5 cm and a power of 0.5 W. A lower side 16 of the ventilator space 15 is in contact with an outlet 14 of air outlet duct 17 which has an inlet 18 in the space between the domes 6, 7. An upper side 19 of the ventilator space 15 is in contact with the inlet 20 of air supply duct 21 having its outlet 22 in the space between the domes 6, 7. The inlet 18 and outlet 22 are situated at diametrically opposed positions on the top face of the detector wall 4.

The internal ventilator 10 provides a closed circuit for forced air circulation from the ventilator space 15 through the supply duct 21, via the space between domes 6,7 and back through the outlet duct 17. The circulating air in combination with the conductive wall 4 equalizes temperature differences within the detector device and results in improved accuracy.

A film heater 9 is placed on the detector body 3.

The ventilator 10 and heater 9 are powered via a signal and power lead 11, while signals are transported along the same signal and power lead. The inner and outer domes 6,7 may be made of similar materials or different materials such as glass or quartz. In a preferred embodiment, the dome 6 is for instance made of glass, the outer dome 7 being made of sapphire.

Figure 2:
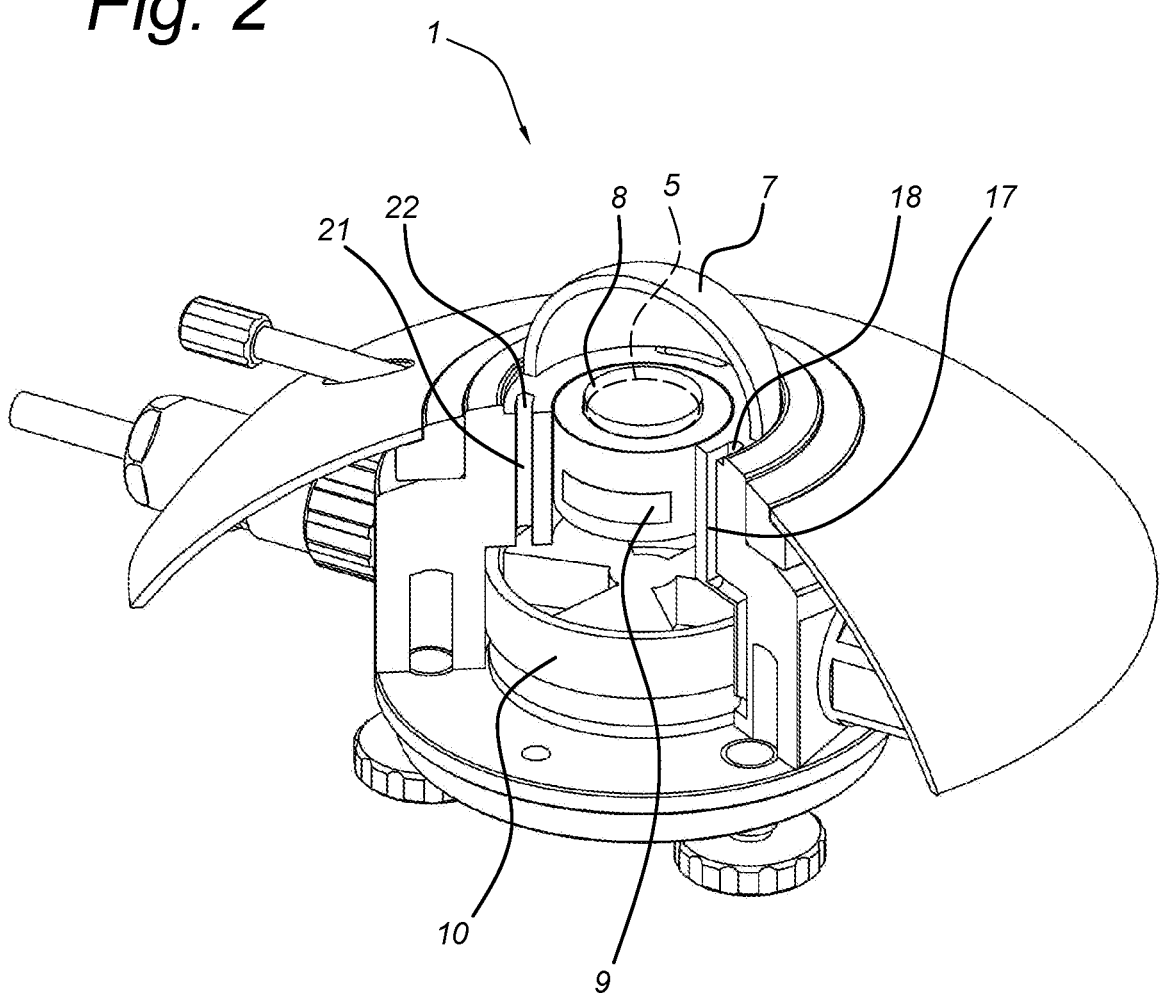
FIG. 2 is a partially cut-away perspective view of a pyranometer of the type of FIG. 1 having a flat diffusor overlying the sensor and an outer dome.

FIG. 2 shows a pyranometer of the type of FIG. 1 wherein like parts are indicated by the same reference numerals. In the pyranometer 1, a diffusor 8 overlies the sensor 5 that in this figure is not visible and has been indicated by the dotted line. The outlet 22 of the air supply duct 21 supplies heated air into the space below the outer dome 7 and above the diffusor 8. Via the inlet opening 18 of the outlet duct 17 air is recirculated back to the ventilator 10.

The invention claimed is:

1. A pyranometer, comprising:
a housing, including a ventilator;
a thermo-electric sensor inside said housing;
an inner window and an outer dome-shaped window, both overlying the sensor; and
an air inlet duct and an air outlet duct, extending in the housing and ending in a space that is bounded by the outer window for passing air through said space, from the inlet duct to the outlet duct,
wherein the housing is substantially closed such that no outside air flows are allowed into the housing,
the inlet duct being in fluid communication with a high pressure side of the ventilator, and
the outlet duct being in fluid communication with a low pressure side of the ventilator, and
wherein air blown into the space that is bounded by the outer window is heated by the ventilator.

2. The pyranometer according to claim 1, wherein the ventilator generates heat that is transferred to a space between the inner window and the outer dome-shaped window via an air displacement generated by the ventilator.

3. The pyranometer according to claim 1,
wherein the thermo-electric sensor is placed on a cylindrical sensor body, and
wherein an electrical heater is provided on or in the sensor body.

4. The pyranometer according to claim 3, wherein heat generated by the heater substantially corresponds to heat loss from device parts facing the sky by far-infra-red radiation.

5. The pyranometer according to claim 3, wherein a power generated by the heater and ventilator combined is between 0.5 and 5 W.

6. The pyranometer according to claim 1,
wherein the inner window is dome-shaped, and
wherein the air inlet duct and the air outlet duct are in fluid communication with a space between the inner window and the outer dome-shaped window.

7. The pyranometer according to claim 6,
wherein the thermo-electric sensor is placed on a cylindrical sensor body, and
wherein the housing includes a cylindrical wall encasing the sensor body,
the cylindrical wall including an annular ventilator space below the sensor body, the air inlet duct extending from an upper ventilator space part axially through the cylindrical wall to an annular top surface of the cylindrical wall, and the air outlet duct extending from a lower ventilator space part through the cylindrical wall to the annular top surface of the cylindrical wall.

8. The pyranometer according to claim 6,
wherein the thermo-electric sensor is placed on a cylindrical sensor body, and
wherein an electrical heater is provided on or in the sensor body.

9. The pyranometer according to claim 6, wherein the ventilator generates heat that is transferred to the space between the inner window and the outer dome-shaped window via an air displacement generated by the ventilator.

10. The pyranometer according to claim 1, wherein the inner window comprises a substantially flat diffusor.

11. The pyranometer according to claim 10,
wherein the thermo-electric sensor is placed on a cylindrical sensor body, and
wherein the housing includes a cylindrical wall encasing the sensor body,
the cylindrical wall including an annular ventilator space below the sensor body, the air inlet duct extending from an upper ventilator space part axially through the cylindrical wall to an annular top surface of the cylindrical wall,
and the air outlet duct extending from a lower ventilator space part through the cylindrical wall to the annular top surface of the cylindrical wall.

12. The pyranometer according to claim 10,
wherein the thermo-electric sensor is placed on a cylindrical sensor body, and
wherein an electrical heater is provided on or in the sensor body.

13. The pyranometer according to claim 10, wherein the ventilator generates heat that is transferred to a space between the inner window and the outer dome-shaped window via an air displacement generated by the ventilator.

14. The pyranometer according to claim 1,
wherein the thermo-electric sensor is placed on a cylindrical sensor body, and
wherein the housing includes a cylindrical wall encasing the sensor body,
the cylindrical wall including an annular ventilator space below the sensor body, the air inlet duct extending from an upper ventilator space part axially through the cylindrical wall to an annular top surface of the cylindrical wall,
and the air outlet duct extending from a lower ventilator space part through the cylindrical wall to the annular top surface of the cylindrical wall.

15. The pyranometer according to claim 14, wherein an electrical heater is provided on or in the sensor body.

16. The pyranometer according to claim 14, wherein the ventilator generates heat that is transferred to a space between the inner window and the outer dome-shaped window via an air displacement generated by the ventilator.

17. The pyranometer according to claim 14,
wherein a directional response with openings of the air ducts in the annular top surface of the cylindrical wall is the same as a directional response of a similar device without the air ducts.

18. The pyranometer according to claim 17, wherein the ventilator generates heat that is transferred to a space between the inner window and the outer dome-shaped window via an air displacement generated by the ventilator.

* * * * *